Sept. 7, 1965 G. L. ALLERTON 3,205,400

ELECTRONIC SWITCHING CONTROL

Filed July 14, 1960 4 Sheets-Sheet 1

INVENTOR
G. L. ALLERTON
By S. Gundersen
ATTORNEY

INVENTOR
G. L. ALLERTON
By L. Gundersen
ATTORNEY

Sept. 7, 1965 G. L. ALLERTON 3,205,400

ELECTRONIC SWITCHING CONTROL

Filed July 14, 1960 4 Sheets-Sheet 3

INVENTOR
G. L. ALLERTON
By S. Gundersen
ATTORNEY

Sept. 7, 1965 G. L. ALLERTON 3,205,400

ELECTRONIC SWITCHING CONTROL

Filed July 14, 1960 4 Sheets-Sheet 4

INVENTOR
G.L.ALLERTON
By S. Gundersen
ATTORNEY 3,205,400
Patented Sept. 7, 1965

1

3,205,400

ELECTRONIC SWITCHING CONTROL

George L. Allerton, Orefield, Pa., assignor to Western Electric Company, Incorporated, New York, N.Y., a corporation of New York Filed July 14, 1960, Ser. No. 42,925
3 Claims. (Cl. 315—25)

This invention relates to electronic switching controls and particularly to switching controls for successively selecting any number of a plurality of inputs and applying them to one or more outputs.

In the testing of electronic circuitry, it frequently becomes expedient to successively sample electrical conditions at different points of a circuit and apply them to a test instrument. Observations of this type are used particularly in conjunction with an oscilloscope in which the several inputs are applied in sequence to the oscilloscope and appear simultaneously due to the visual retentivity of the oscilloscope screen.

Prior art devices provide several arrangements for alternately applying two signals to an oscilloscope. Such arrangements utilize binary switches such as flip-flop circuits or electronic or mechanical multivibrators. Systems of this type may be adapted to handle a greater number of inputs than two. However, modifications in design to accommodate the additional inputs increases the complexity and number of active elements (i.e., electron tubes) of the circuitry usually in geometric proportion to the increased number of inputs. Furthermore, each such circuit can be used only for the particular number of inputs for which it is designed. This lack of adaptability to changing requirements imposes an undesirable burden when the systems are used in production as contrasted with laboratory tests. There exists a need in the art for a switching system which is flexible in its adaptability to different numbers of inputs, and which is simple and economical, requiring merely the insertion or removal of passive elements to accommodate new situations.

It is an object of the invention to provide a switching mechanism which will permit a number of inputs to be successively switched to one or more outputs.

It is a further object of the invention to provide a switching circuit which can be used in a measuring system such as a conventional single beam oscilloscope to look at two or more circuits simultaneously.

An additional object of the invention is to provide a device for the repetitive sampling of two or more input signals with provision for adjusting the phase at which the sampling occurs.

To achieve these objects the invention provides a system for successively switching one or more signal inputs to one or more signal outputs, which utilizes one of several types of multiple cathode stepping tubes. These tubes are characterized in operation by sustained conduction through one cathode at a time, conduction being transferred to another cathode upon application of a suitable transfer signal to the tube. In the invention, each conducting cathode is capable of being connected in series to one of several relay coils. The stepping cathodes of the tube are connected to a pulse source so that application of pulses to the stepping cathodes steps conduction from one conducting cathode to the next adjacent conducting cathode. The relays operated by the conducting cathodes each have one pair of normally open contacts with one of the signal inputs connected to one contact and the other contact connected to one of the outputs. Conduction through the tube to a particular conducting cathode and its related relay coil closes the normally open contacts and applies the signal input to the desired output. The pulse source includes a signal generator and

2 an amplifier. The signal generator is connected in a circuit including a source of the signal inputs and the amplifier is provided with a phase control circuit for adjusting the phase of the pulses supplied to the stepping cathodes so that a normally open contact is closed in predetermined phase relationship with the signal connected thereto.

The invention will be understood in relation to the following description taken in conjunction with the drawings in which.

Figure 7A:
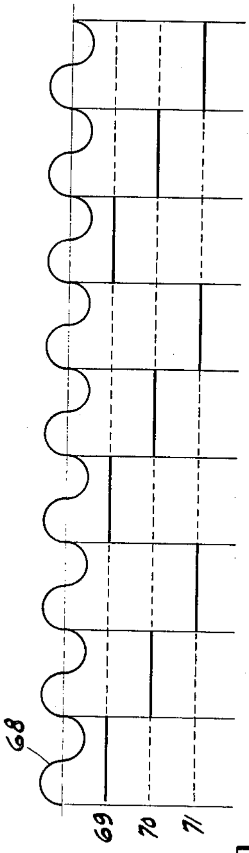
Figure 7B:
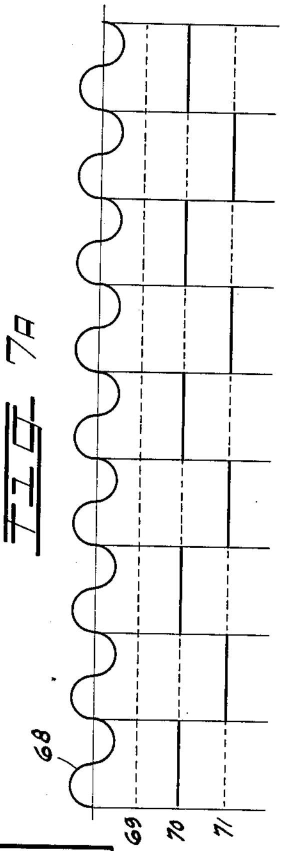
Figure 7C:
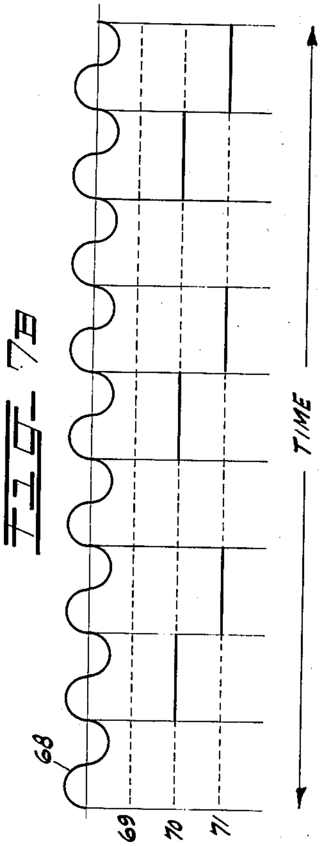
Figure 2:
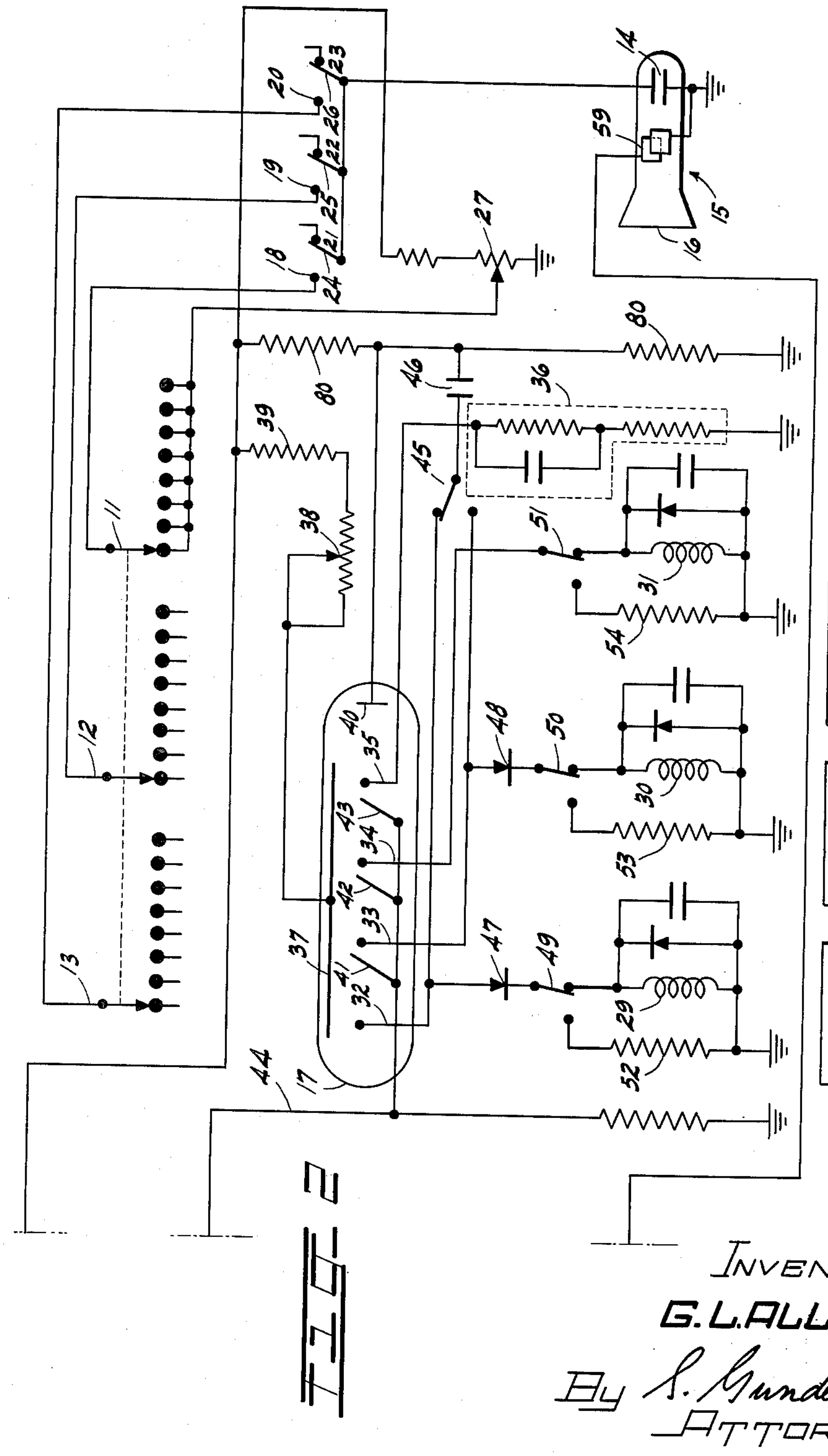
FIG. 2 is a schematic illustrating a stepping and switching circuit according to the invention.
Figure 8:
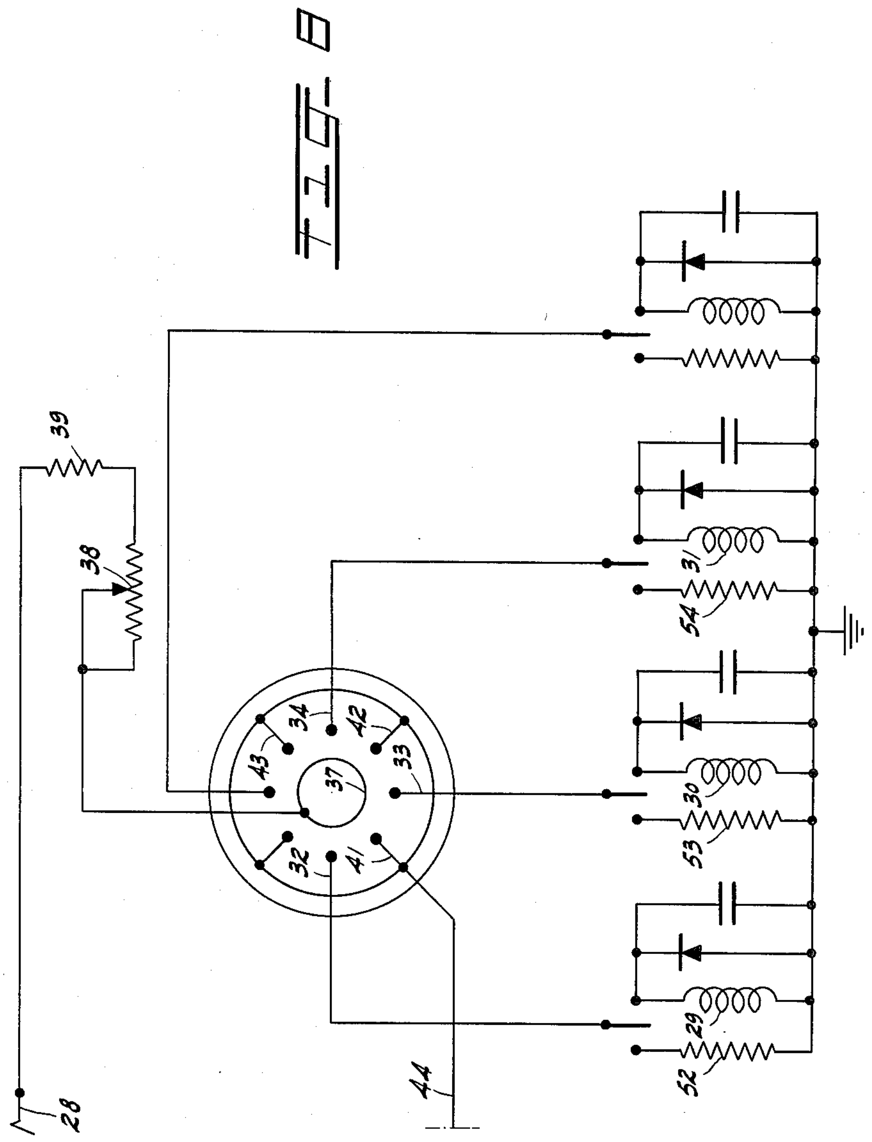

FIGS. 5 and 6 show wave forms at certain points of the circuit of FIG. 2 respectively for 10-cycle per second and 15-cycle per second repetition rates;

FIGS. 7A–7C represent respectively the timing sequences for a three-signal input, a two-signal input, and a three-signal input with one input signal neutralized;

FIG. 8 is a circuit schematic of an inventive embodiment illustrating the use of a stepping tube with circularly arranged cathodes.

Figure 1:
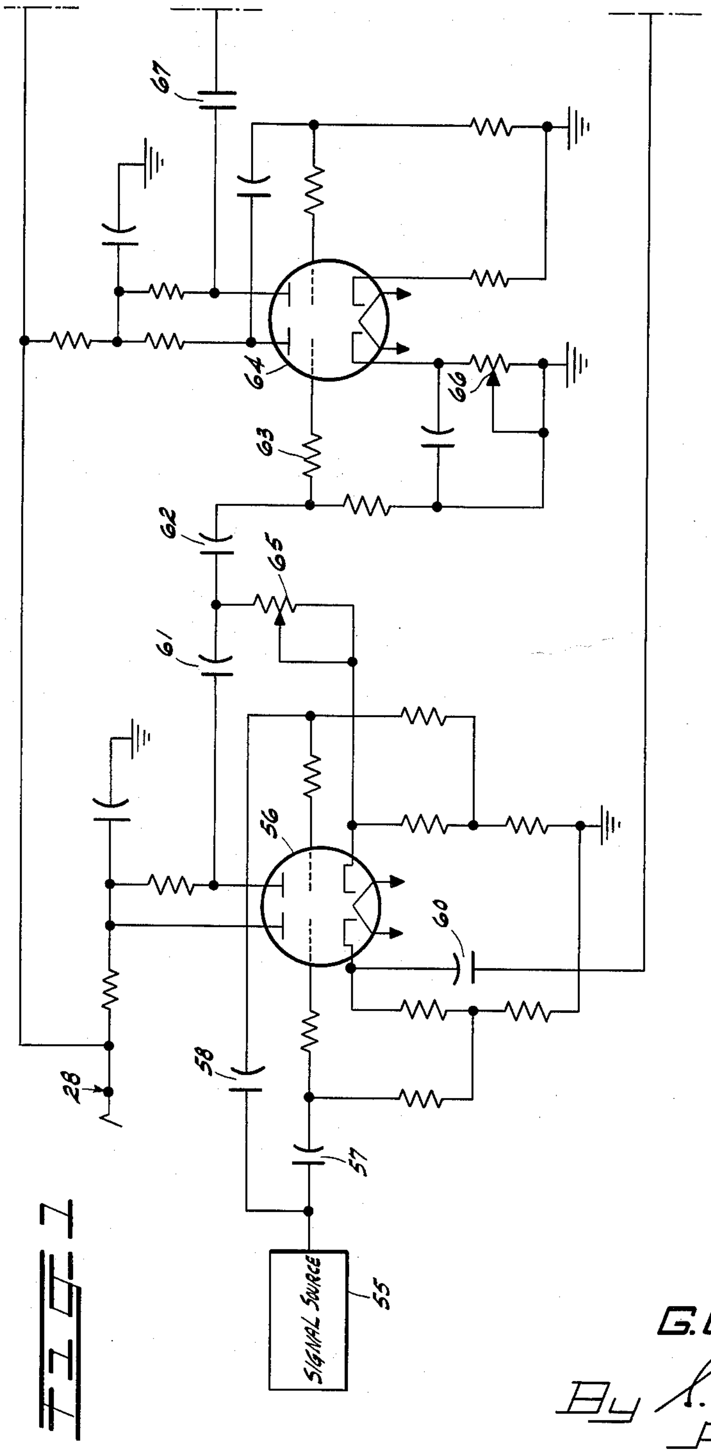
FIG. 1 represents a pulse source circuit the output of which is applied to the multicathode and relay circuit of FIG. 2.
Figure 3:
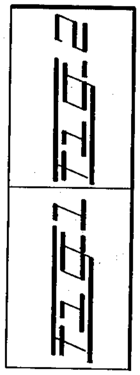
FIG. 3 shows the relationship of FIG. 1 and FIG. 2.

The embodiment of the invention shown in FIGS. 1 and 2 should be viewed conjointly according to their relative positions as shown in FIG. 3. In this embodiment it is desired to successively apply the inputs 11, 12 and 13 to the vertically deflecting plates 14 of oscilloscope 15. This permits all of the input signals to be seen simultaneously on oscilloscope screen 16 by virtue of the screen's retentive characteristic. Three inputs have been chosen in this situation to illustrate the invention, although it should be understood that the number of inputs which can be handled by the invention is indefinite. Additional inputs would merely require additional cathode circuits in the counting or stepping tube 17 as will be evident from the description which follows. One of the benefits of the invention derives from the fact that a single counter tube sufficient to handle the maximum foreseeable requirements is used also for any number of inputs less than maximum. In general, this is not true of prior art switching devices which require switching circuits uniquely applicable to a single number of inputs which must be removed and replaced with another unique circuit when a different number of inputs is to be sequentially sampled on a repetitive basis.

Inputs 11–13 are led respectively to normally open contacts 18–20 of relays 21–23 which have relay armatures 24–26 respectively connected to the vertical deflection plates 14 of oscilloscope 15. Input 11 is connected through adjustable resistor 27 to the B+ supply which obtains its power through input jack 28. By adjusting resistor 27, a horizontal base line level may be set on the oscilloscope from which comparative measurements of the other inputs may be made. This feature is particularly useful in comparative measurement techniques in which the inputs 12 and 13 may be switched between the objects undergoing test and standard elements. Variable attenuators (not shown) may be used to establish levels for the reference and the standard from which deviations of the test object can be measured in terms of decibels.

The transfer coils 29–31 of relays 21–23 which respectively transfer armatures 24–26 to contacts 18–20 appear in the circuits of conduction cathodes 32–34 of stepping tube 17. The circuit of end cathode 35 does not have a relay coil associated with it but only a resistor-capacitor combination 36 selected to minimize the effects of successive occurrence should the stepping tube 17 be stopped on cathode 35. As will be explained later, however, conduction through end cathode 35 occurs simultaneously with conduction in either cathode circuit 32 or 33 so that no time gap exists in the sequential sampling of inputs 11–13.

In the counting tube, the principal anode 37 is placed in the tube opposite all the cathodes 32–34 as well as end cathode 35. The voltage appearing at anode 37 is determined by means of adjustable resistor 38 and resistor 39 connected to the B+ supply so that conduction is maintained during operation between at least one of each of the cathodes 32–35 and anode 37. Auxiliary anode 40 is placed adjacent end cathode 35 set at a lesser voltage than principal anode 37 by means of voltage divider resistors 80. Conduction is advanced from one cathode in the group 32–35 by means of stepping cathodes 41–43 connected to a common pulse input 44. Cathode circuits 32 and 33 are connected through two-position switch 45 and isolating capacitor 46 to auxiliary anode 40. In parallel with the switch 45, capacitor 46, and lower resistor 80 in cathode circuits 32 and 33, respectively, are varistors or diodes 47 and 48 poled to prevent the passage of pulses originating at auxiliary anode 40 to relay coils 29 and 30. Two-position switches 49–51 are in series with the cathodes 32–34 and switch the cathodes between relay coils 29–31 and parallel resistors 52–54.

The pulses delivered through pulse input circuit 44 to the stepping cathodes 41–43 of counting tube 17 may be of any appropriate magnitude or duration to reliably step conduction successively from one of cathodes 32–34 to the next adjacent cathode. The circuit of FIG. 1 is particularly adaptable to supplying such an adequate pulse, in this instance of approximately 140 volts, even though the input trigger pulses to the circuit from signal source 55 varies from about 5 volts to an indeterminately high value. The circuitry of FIG. 1 is determined for the most part by the amplification and clipping required from each stage. For these purposes, the circuitry is conventional and a detailed description of the structure is unnecessary for understanding the invention. The phase switching feature, which has particular significance in relation to the invention, will be treated below in detail.

Vacuum tube 56 is of the duo-triode type. A pulse from the signal source 55 is fed through parallel capacitors 57 and 58 to the respective grids of the first or lefthand section of the tube and the second or righthand section of the tube. The lefthand section of tube 56 provides a low impedance input signal for the horizontal plates 59 of oscilloscope 15 through capacitor 60 in a cathode follower arrangement. The horizontal sweep of oscilloscope 15 is thus synchronized with the stepping action of counter tube 17 and relays 21–23.

The principal function of the second or right half of vacuum tube 56 is to provide phase adjustment for operating the relays 21–23 so that the input signal will appear on oscilloscope screen 16 at a given position on the horizontal sweep. In the most usual case, this will involve activating the relay so that the vertical plates 14 of the oscilloscope will receive the beginning of the input signal at precisely the same time as the horizontal sweep begins. Capacitors 61 and 62 are connected in series between the anode of the second portion of tube 56 and grid resistor 63 of the first half of vacuum tube 64. Adjustable potentiometer 65 connected from the cathode of the second half of tube 56 to the center point of capacitors 61 and 62 provides for a phase variation of the input pulse of from zero to nearly 180 degrees. This phase adjustment is particularly useful in one application of the embodiment of FIGS. 1 and 2 used to test characteristics of traveling wave tubes. In these tests an input test signal is swept from 8,500 to 9,000 megacycles per second for determination of the traveling wave tube transmission characteristics in that band. Triggering of the high frequency test signal generator sweep (not shown) is effected by the same signal source 55 as provides the input pulse to vacuum tube 56. It is most desirable to view an entire sweep cycle starting at 8,500 megacycles. Coincidence of both the start of the 8,500 megacycle sweep and the start of the horizontal sweep of the oscilloscope is established by means of the switch phase potentiometer 65.

The first half of vacuum tube 64 comprises an oversaturated amplifier which clips the pulse. Adjustment of the peak-to-peak output voltage of this stage is achieved with variable potentiometer 66. The second or righthand portion of vacuum tube 64 constitutes an amplifier which brings the signal level of the clipped pulse to about 140 volts peak-to-peak. This voltage is delivered through capacitor 67 to pulse input circuit 44 of counter tube 17 for application to stepping cathodes 41–43. The extent of amplification in the righthand section of vacuum tube 64 varies considerably as the input voltage from signal source 55 varies from 5 volts to extreme values, for example, 100 volts. At a peak-to-peak input voltage of 22 volts there is only an increase in signal level of about 8 percent between the left and righthand portions of vacuum tube 64.

Figures 4, 4A, 4B, 4C, 4D, 4E, 4F:
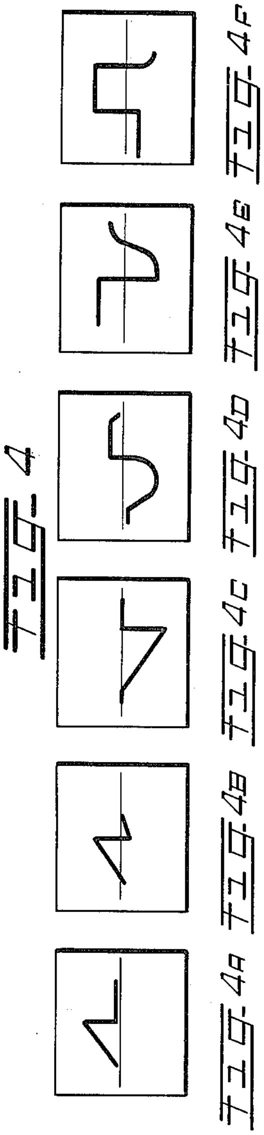
FIGS. 4A–4F show typical wave forms for particular points in the circuit of FIG. 1.

The functional effect of the circuit of FIG. 1 will be better appreciated from the pulse forms of FIGS. 4A–4F. FIG. 4A represents the input 22-volt, peak-to-peak, 30-cycle per second sawtooth signal which is fed to the grids of both the left and righthand sections of tube 56 by signal source 55. The input pulse is slightly modified in the lefthand vacuum tube at 56 and appears at the input to horizontal plates 59 of oscilloscope 15 as an 18-volt, peak-to-peak, 30-cycle pulse, FIG. 4B. FIG. 4C shows the inverted sawtooth at the righthand section of tube 56 at 50 volts peak to peak. The phase of the pulse in the succeeding portions of the amplifier is influenced by the position of phase potentiometer 65. A phase adjusted voltage of 13 volts (FIG. 4D) appears at the grid of the lefthand section of vacuum tube 64. The pulse at the anode of the lefthand stage of vacuum tube 64 is negative 130 volts peak to peak as seen in FIG. 4E. The pulse is inverted and appears substantially as a positive pulse of 140 volts peak to peak (still at 30 cycles per second) at the anode of the righthand section of tube 64. It is this pulse which appears on the stepping cathodes 41–43 of the counter tube.

In FIGS. 7A–7C, the timing signal of 30 cycles per second is represented by the sine curve 68. Horizontal lines 69, 70 and 71 represent conduction through relay coils 29, 30 and 31; connection of relay armatures 24, 25 and 26 with contacts 18, 19 and 20; and application of inputs 11, 12 and 13 to vertical plates 14.

FIG. 7A represents the timing sequence of pulses delivered to the vertical plates 14 of the oscilloscope when switch 45 connects capacitor 46 to cathode circuit 32 and switch 49 connects diode 17 to relay coil 29. Counter tube 17 is then operated as a three-ring counter. The inputs 11–13 are successively and repetitively applied to the oscilloscope. Due to the visual carryover of the oscilloscope, they are seen simultaneously and continuously.

FIG. 7B represents the situation in which switch 45 is thrown to its lower position connecting capacitor 46 to cathode circuit 33. The negative pulse, which occurs in the auxiliary anode 40 circuit when cathode 35 conducts, is then passed through the capacitor 46 to cathode 33, cathode 32 being bypassed. This feedback pulse is blocked from passage to relay coil 30 by diode 48 so as to assure that the pulse is not dissipated in the relay coil before effecting transfer of conductivity to cathode 33. Upon condition of cathode 33, current is passed through relay coil 30. This operation is analagous to the operation which occurs in cathode circuit 32 when switch 45 is in its upper position, and causes the stepping action of the switching tube to occur continuously. However, with the switch 45 in the lower position, there is no conduction in cathode circuit 32 and relay 21 is effectively bypassed. Conduction occurs consecutively and repetitively in cathode circuits 33, 34 and 35 and through relay coils 30 and 31. Only input signals 12 and 13 appear on the oscilloscope screen.

FIG. 7C illustrates operation of the switching control when switch 45 is in its upper position and switch 49 is in its lefthand position bypassing relay coil 29. Input signal 11, represented by dashed line 69, is not applied to the oscilloscope. The horizontal trace of the oscilloscope does, however, make a horizontal sweep and a line appears at zero vertical deflection. Inputs 12 and 13, represented by lines 70 and 71, respectively, occur repetitively at a rate of 10 cycles per second.

Figures 5A, 5B, 5C, 6A, 6B, 6C:
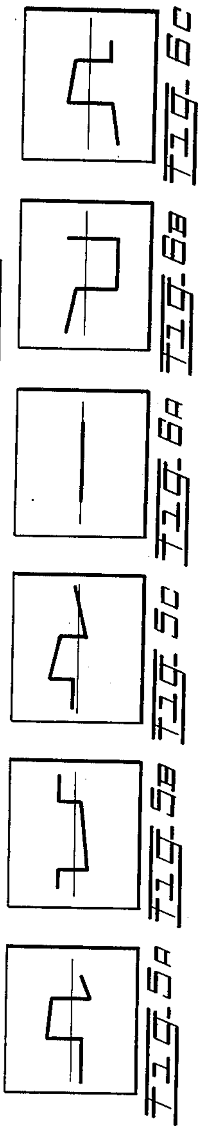

FIGS. 5A–5C show voltages appearing at the ungrounded ends of relay coils 29, 30 and 31, respectively, for the ten-c.p.s. repetitive rate, three-trace operation when switch 45 is in its upper position. Each of these voltages is approximately 9 volts peak to peak. FIGS. 6A–6C represent voltages at the ungrounded ends of relay coils 29, 30 and 31 when switch 45 is in its lower 15 c.p.s. repetitive rate, two-trace position. The voltage in cathode circuit 32 is zero volts, while the voltages in circuits 33 and 34 are approximately 5 volts peak to peak.

Other embodiments of the invention which have ready applicability may depend upon different arrangements of the counter tube than that shown above. As has been indicated, any number of inputs may be handled in a similar way to that described, the only limitation being the number of counter cathodes in the tube. Other types of counter or glow tubes than the one having cathodes in linear arrangement may be used. For example, the cathodes may be arranged in a circular array as shown in FIG. 8 (analagous elements to those in FIG. 2 have the same reference numerals) so that successive steps occur continuously without the necessity of a triggering cathode 35 and auxiliary anode 40. Furthermore, the relays, which in the illustrative embodiment are of the mercury contact type, may be replaced by another flip-flop or conduct-nonconduct arrangement triggerable by an element in series with the counter cathode circuits. In addition, the pulse input circuit of FIG. 1 is capable of a large number of variations. The above description is, therefore, to be understood as being simply illustrative of the application of the principles of the invention. Other arrangements than those proposed may be readily devised by a person skilled in the art which will embody the principles and fall within the spirit and scope of the invention.

What is claimed is:

1. Apparatus for successively switching one or more of a plurality of inputs to one or more outputs, which comprises:
 (a) a multiple cathode stepping tube having a plurality of conducting cathodes and a plurality of stepping cathodes;
 (b) a plurality of relays,
  (1) the coil of each relay being connected to a respective one of the conducting cathodes and being operable to energize upon conduction thereof,
  (2) a normally open contact of each relay being connected to one of the signal inputs, and
  (3) a transfer armature of each relay being connected to one of the outputs and being operable upon energization of its respective relay coil to transfer to the corresponding normally open contact and thereby complete a circuit from the corresponding input to the corresponding output; and
 (c) a pulse source for supplying pulses to the stepping cathodes to step conduction from one conducting cathode to the next adjacent conducting cathode, the pulse source including
  (1) a signal generator connected in a circuit including a source of the signal input, and
  (2) an amplifier having an input connected to the signal generator, an output connected to the stepping cathodes and a phase control circuit for adjusting the amplifier phase so that transfer of the armature of a particular relay occurs in a predetermined phase with the respective input signal.

2. In a system for visually displaying a plurality of electrical signals, which system includes an oscilloscope having first and second sets of deflection plates and a sweep signal generator having an output connected to the first set of oscilloscope deflection plates, the improvement which comprises:
 (a) a plurality of relays, each relay having a first contact connected to the second set of oscilloscope deflection plates;
 (b) means for connecting a plurality of electrical signals to be displayed to respective second contacts of the relay;
 (c) a multicathode stepping tube having
  (1) a main anode,
  (2) a plurality of successive conducting cathodes, and
  (3) a plurality of stepping cathodes, the stepping and conducting cathodes being arranged with respect to each other and the main anode such that a glow discharge may be established between one conducting cathode and the main anode, and may be stepped from this conducting cathode to another conducting cathode by the application of pulses to the stepping cathodes;
 (d) a plurality of individual circuits connected to different ones of the conducting cathodes, each circuit including an operating coil of one of the relays and and a unidirectional conducting device;
 (e) pulse supply means for supplying pulses to the stepping cathodes to sequentially step the glow discharge along the successive conducting cathodes, each conducting cathode, upon the glow discharge being established thereto, completing an energizing circuit to its relay coil to energize the same and establish electrical continuity between the first and second contacts of the relay, thereby enabling a signal connected to the second contact to be connected to the second set of oscilloscope deflection plates and displayed on the oscilloscope; and
 (f) means for changing the stepping sequence of the tube which includes
  (1) an end conducting cathode following the final one of the successive conducting cathodes,
  (2) an auxiliary anode arranged with respect to the end conducting cathode such that when a glow discharge is established between this conducting cathode and the main anode, a glow discharge is also established between the latter cathode and the auxiliary anode,
  (3) a capacitor having one plate connected to the auxiliary anode, and
  (4) a multiposition switch having one arm connected to the other plate of the capacitor and having a plurality of contacts corresponding to the positions of the switch, each of the contacts being connected to a different one of the conducting cathodes such that when a glow discharge is established to the auxiliary anode, the resultant pulse is transmitted through the capacitor and the switch to the conducting cathode corresponding to the switch position to cause transfer of the glow discharge to that cathode, the unidirectional conducting device in the latter cathode circuit preventing dissipation of the pulse in the corresponding relay coil so as to assure completion of the transfer of the glow discharge.

3. In a system for visually displaying a plurality of electrical signals, which system includes an oscilloscope having first and second sets of deflection plates and a sweep signal generator having an output connected to the first set of oscilloscope deflection plates, the improvement which comprises:

(a) a plurality of relays, each relay having a first contact connected to the second set of oscilloscope deflection plates;

(b) means for connecting a plurality of electrical signals to be displayed to respective second contacts of the relay;

(c) a multicathode stepping tube having (1) a main anode, (2) a plurality of successive conducting cathodes, and (3) a plurality of stepping cathodes, the stepping and conducting cathodes being arranged with respect to each other and the main anode such that a glow discharge may be established between one conducting cathode and the main anode, and may be stepped from this conducting cathode to another conducting cathode by the application of pulses to the stepping cathodes;

(d) a plurality of individual circuits connected to different ones of the conducting cathodes, each circuit including an operating coil of one of the relays;

(e) pulse supply means for supplying pulses to the stepping cathodes to sequentially step the glow discharge along the successive conducting cathodes, each conducting cathode, upon the glow discharge being established thereto, completing an energizing circuit to its relay coil to energize the same and establish electrical continuity between the first and second contacts of the relay, thereby enabling a signal connected to the second contact to be connected to the second set of oscilloscope deflection plates and displayed on the oscilloscope; and (f) means for enabling elimination of any one of the signals from the viewing sequence, said means including a resistor and a switch in each conducting cathode circuit, the switch being operable to connect its respective cathode between the corresponding relay operating coil and the corresponding resistor so that when the coil is connected to the cathode the corresponding signal is displayed on the oscilloscope upon conduction of the cathode, and so that when the resistor is connected to the cathode the signal is not displayed on the oscilloscope upon conduction of the cathode.

References Cited by the Examiner

UNITED STATES PATENTS

| | | | |
|---|---|---|---|
| 2,146,862 | 2/39 | Shumard | 315—26 |
| 2,575,370 | 11/51 | Townsend | 315—84.6 |
| 2,963,595 | 12/60 | Hinrichs | 317—137 |
| 2,985,794 | 5/61 | Sarratt | 315—202 |
| 3,084,287 | 4/63 | Beadsmoore | 328—104 |

FOREIGN PATENTS

| | | |
|---|---|---|
| 769,698 | 3/57 | Great Britain. |

DAVID G. REDINBAUGH, *Primary Examiner.*

RALPH G. NILSON, ARTHUR GAUSS, *Examiners.*